United States Patent Office 2,924,579
Patented Feb. 9, 1960

---

2,924,579

METHOD OF PREPARING ALUMINUM CHLORIDE COMPLEX CATALYST

David W. Young, Westfield, N.J., assignor to Esso Research and Engineering Company, a corporation of Delaware No Drawing. Application March 23, 1955
Serial No. 496,321

1 Claim. (Cl. 252—431)

This invention relates to novel mixed or complex catalysts and to the preparation and uses thereof, and it relates especially to catalysts comprising alkyl derivatives of aluminum in conjunction with aluminum chloride.

It has been observed that some of the active Friedel-Crafts metal halide catalysts used heretofore are undesirably fast when used, for example, for polymerization of olefins, diolefins, and triolefins, and are not as satisfactory as desired for making copolymers. It is very hard to obtain good control over the polymerization reaction, such as heat, etc.

According to the present invention, a catalyst is prepared which is slower in behavior and will polymerize olefins, diolefins and triolefins at a more normal reaction conversion rate.

The modified catalysts of the present invention comprise an alkyl aluminum compound having the general empirical formula $$AlR_nCl_{3-n}$$

in which R is an alkyl group of 1 to 2 carbon atoms and $n$ is an integer of 2 to 3, activated with $AlCl_3$.

Specific examples of these catalysts have empirical formulas as follows:

$$Al(CH_3)_3 \cdot AlCl_3$$
$$Al(CH_3)_2Cl \cdot AlCl_3$$
$$Al(C_2H_5)_3 \cdot AlCl_3$$

and the molar proportions of the alkyl aluminum compound and the aluminum chloride may vary as desired. Equal molar proportions are satisfactory.

The complex catalyst may be made by admixing the aluminum chloride with the alkyl aluminum compound, with some heating if necessary to start the reaction. As the alkyl aluminum compounds which may either be made by known methods or may be purchased on the market, are highly reactive, both with oxygen and moisture, and generally spontaneously inflammable, they must be handled in an inert atmosphere such as nitrogen. The water-white oily liquid alkyl aluminum compound and the aluminum chloride may be suitably mixed or ground together in a mortar at room temperature, and then the mixture permitted to react, with mild heating, if necessary, until the reaction is complete. This may be indicated by cessation of evolution of heat, and by fusion or liquefying of the composition, which generally darkens in color.

The details and advantages of the invention will be better understood from a consideration of the following experimental data.

*Example*

Aluminum triethyl is complexed with aluminum chloride, in substantially equal molar proportions, by the method described hereinabove, to make a complex catalyst having the formula $$Al(C_2H_5)_3 \cdot AlCl_3$$

Working under nitrogen, this catalyst at a concentration of 0.05 g./ml., was added to butane, and then slowly added to a liquid mixture of isobutylene, ethane and ethylene at a temperature of about $-101°$ C. Polymerization took place, and after one hour with good agitation, 14% polymer was obtained. After separation from the polymerization mixture, the polymer was found to have a Staudinger mol. wt. of about 4,000.

As the molecular weight of polyisobutylene obtained with simple aluminum chloride catalyst at $-101°$ C. would be much higher than 4,000, the low molecular weight obtained above is an indication that some ethylene copolymer or polymer is made with modified catalysts of this type, i.e. aluminum chloride complexed with aluminum triethyl. The above example also shows that $AlCl_3$ can be solubilized in hydrocarbons, and that the complexes are active catalysts.

Having now described and illustrated the invention, what is desired to be secured by Letters Patent is defined in the accompanying claim.

I claim:

The method of making a modified catalyst which comprises grinding aluminum chloride under nitrogen in substantially equal molar proportions with aluminum triethyl, at room temperature, and, after cessation of evolution of heat of reaction, dissolving the resultant catalyst at a concentration of about 0.05 g./ml. in butane.

References Cited in the file of this patent

UNITED STATES PATENTS

| | | |
|---|---|---|
| 2,387,517 | Kraus | Oct. 23, 1945 |
| 2,388,428 | Mavity | Nov. 6, 1945 |
| 2,440,498 | Young et al. | Apr. 27, 1948 |
| 2,563,631 | Young et al. | Aug. 7, 1951 |

OTHER REFERENCES

Thomas: "Anhydrous Aluminum Chloride in Organic Chemistry," New York, 1941, pp. 102–104.

"Brennstoff-Chemie" of June 25, 1952, pp. 193–224.

"Angewandte Chemie" of June 21, 1952, pp. 323–350.